US005079027A

United States Patent [19]

Wong et al.

[11] Patent Number: 5,079,027

[45] Date of Patent: Jan. 7, 1992

[54] NUT BUTTER AND NUT SOLID MILLING PROCESS

[75] Inventors: Vincent Y. Wong, West Chester; Phillip F. Pflaumer, Hamilton, both of Ohio

[73] Assignee: Procter & Gamble Company, Cincinnati, Ohio

[21] Appl. No.: 456,360

[22] Filed: Jan. 8, 1990

Related U.S. Application Data

[63] Continuation-in-part of Ser. No. 304,393, Jan. 30, 1989, abandoned.

[51] Int. Cl.[5] ..... A23L 1/38

[52] U.S. Cl. ..... 426/633; 426/518; 426/632

[58] Field of Search ..... 426/632, 633, 518

[56] References Cited

U.S. PATENT DOCUMENTS

| | | | |
|---|---|---|---|
| 1,395,934 | 11/1921 | Stockton | 426/633 |
| 1,921,275 | 9/1933 | Werner | 426/633 |
| 2,511,115 | 6/1950 | Lazier | 99/128 |
| 2,976,154 | 3/1961 | Brown et al. | 99/128 |
| 3,115,412 | 12/1963 | Schoppe et al. | 426/632 |
| 3,317,325 | 5/1967 | Durst | 99/126 |
| 3,619,207 | 11/1971 | Dzurik | 426/633 |
| 4,000,322 | 12/1976 | Billerbeck et al. | 426/633 |
| 4,004,037 | 1/1977 | Connick | 426/324 |
| 4,364,967 | 12/1982 | Black | 426/632 |
| 4,504,513 | 3/1985 | Black | 426/632 |
| 4,639,374 | 1/1987 | Matsunbu et al. | 426/43 |
| 4,667,015 | 5/1987 | May | 426/632 |
| 4,728,526 | 3/1988 | Avera | 426/633 |
| 4,814,195 | 3/1989 | Yokoyama et al. | 426/633 |
| 4,828,868 | 5/1989 | Lasdon et al. | 426/633 |

FOREIGN PATENT DOCUMENTS

| | | |
|---|---|---|
| 0349040 | 6/1989 | European Pat. Off. . |
| 2007961 | 11/1978 | United Kingdom . |

*Primary Examiner*—Donald E. Czaja
*Assistant Examiner*—Helen Pratt
*Attorney, Agent, or Firm*—Rose Ann Dabek; Jerry J. Yetter; Richard C. Witte

[57] ABSTRACT

Disclosed is a nut butter spread composition, having a Casson plastic viscosity value of less than 12 poise comprising from 25% to 55% peanut oil, or other fat component, and from about 40% to about 67% nut solid particles which have been processed to a particle size distribution in which at least 80% have a particle size less than 18 microns, and preferably between about 2 and about 11 microns. The surfaces of the protein and starch bodies of the nut solids are smooth due to a reduction of cytoplastic reticuli surrounding the protein bodies. The particle size distribution is monodispersed, i.e. a curve with a single peak. A process for preparing these particle size peanuts using a roll milling process which can be followed by a separate smearing step is also disclosed. A low fat peanut butter having from 25% to 40% peanut oil is the preferred nut butter.

25 Claims, No Drawings

NUT BUTTER AND NUT SOLID MILLING PROCESS

This application is a continuation-in-part of copending Ser. No. 07/304,393, filed Jan. 30, 1989, abandoned 1-25-90.

FIELD OF THE INVENTION

This invention relates to improved nut butters, and preferably to a reduced fat level peanut butter, containing nut solids in which at least about 80% have a particle size of less than 18 microns, and most preferably wherein 90% have a particle size of less than 13 microns. The reduced fat peanut butter has a higher protein level than full fat nut butters, yet has the same viscosity. The nut particles are prepared by a process which reduces the solids to a monodisperse particle size distribution and which smooths the surfaces of the nuts' protein bodies. Preferably this is done by a roll milling process followed by extrusion.

BACKGROUND OF THE INVENTION

Conventional peanut and other nut butters consist of a mixture of solid nut particles, liquid oil, and flavorants, e.g. a sweetener such as sugar, high fructose corn syrup or honey, and salt. Peanut butter is made by roasting raw peanut kernels and then blanching and grinding them. The comminuted nut particles are suspended in the oil from the nut (or added oil) to form a product having a pasty and spreadable consistency. In time, however, part of the oil separates from the product and forms a separate layer on the top of the peanut butter and a rigid crumbly mass underneath. This tendency of peanut butter to separate on standing can be overcome to some extent by the use of stabilizers. Stabilizers are generally partially hydrogenated or highly hydrogenated fats and oils or other emulsifiers.

Peanut butters typically contain about 50% oil and about 50% solids. The stabilizer is usually added at a level of 0.5% to 3% by weight. Salt and sugar can be added to improve the flavor.

The spreadability and perceived stickiness (tendency of the peanut butter to adhere or stick to the roof of one's mouth and its resistance to breakdown during chewing) are highly sensitive to the fat content of peanut butter. The lower the fat content, the harder the product is to spread and the greater is the stickiness perception. Consequently, reduction of the fat content by 25% or more (to about 37% of the peanut butter) while maintaining acceptable texture has not been achieved.

Analysis of current peanut butter products shows the particle size distribution of the peanut solids to be primarily two different ranges. One distribution curve is composed of particles in the range of from about 18 to about 118 microns, with the central portion of the distribution being between about 24 and 118 microns in size. The second particle size distribution range is primarily between about 3 microns and about 14 microns with the major distribution being between 5 microns and 11 microns. This distribution is bimodal, i.e., two distribution curves which overlap.

The process herein produces nut solids having a particle size in which the major distribution (80% or more) of particles is a single particle size range of 18 microns or less, and preferably wherein 90% of the particles are less than 13 microns. Surprisingly, with these small particles, the product is acceptable in both spreadability and stickiness while being very smooth. This smoothness requires that the particles be well mixed with the remaining oil. The milling and smearing process herein results in a peanut butter with a lower fat level while providing a product equivalent to a full fat nut butter in taste and spreadability. Full fat products made with these milled solids are creamier and smoother than conventional full fat nut butters.

As the fat level in peanut butter is reduced, the protein level is increased since the peanut solids level of the product increases.

Accordingly, it is an object of this invention to lower the fat level of peanut butter and other nut butters without loss in its flavor and texture compared to conventional products.

Another object of this invention is to provide a process for efficiently producing peanut and other nut solids wherein the major portion of the solids has a particle size of less than 18 microns and also wherein 90% of the particles are less than 13 microns in size.

A third object is to make a peanut butter which contains bulking agents, e.g. fibers, or other additives, but which maintains the smooth creamy texture of peanut butter.

It is also an object of this invention to make a whipped peanut butter which is low in fat but which tastes like a full fat peanut butter and which does not collapse, i.e. lose the gas over time.

These and other objects will become apparent from the description below.

All percentages of compositions herein are by weight unless otherwise noted.

All particle size distributions are by volume percent.

SUMMARY OF THE INVENTION

Ground nut solids having from about 5% to about 33% oil, from about 25% to about 50% protein, the remainder being plant materials, 80% of said solids having a particle size of less than 18 microns, and most preferably, 90% of said solids having a particle size of less than 13 microns are disclosed herein. These nut solids are processed to have not only the requisite particle size, but also to have a particle surface that is smooth, i.e. the cytoplastic reticuli have been removed from the particle surface of the protein and starch bodies. The surface is also coated with oil which improves the fluidity at a reduced fat level.

A nut butter composition having a Casson plastic viscosity of less than 12 poise; said composition comprising:

(a) from about 65% nut solids, at least 80% of said solids having a particle size of less than 18 microns, and preferably being between 2 and 11 microns, and most preferably 90% of said solids being less than 13 microns in size;

(b) from about 25% to about 55% oil, preferably from the same nut as the solids;

(c) from 0% to about 3% emulsifier;

(d) from 0% to about 3% stabilizer; and (e) from 0% to about 8% flavorant is also disclosed.

The Casson Plastic Viscosity is 8 to 15 times less viscous than similar reduced fat nut butter made with conventional milled solids. (Note: this viscosity is for a heated peanut butter in which any stabilizer which has been added is in a liquid state.) The viscosity of peanut butters and other nut butters varies with the fat content.

The invention also comprises a process for reducing the particle size of defatted nuts to less than 18 microns and concurrently or subsequently smoothing the particle surface. The preferred method is milling the nuts to the desired particle size range by roll milling nut solids using a multiple roll mill with zero gap setting and differential roll speeds. The differential speed ratio between the second and last roll (roll where product is removed) can vary from 2 to 10 and preferably from 5 to 7. The pressure on the rolls is adjusted accordingly to insure that a uniform film forms across the rolls. The surface of the protein bodies constituting the nut solids can be further smoothed via processing the milled nut solids through a smearing mill or a twin screw mixer, extruder, or other smearing mixing device. The removal of the cytoplastic reticuli from the surface of the protein bodies causes the protein surface to be smooth and therefore lowers the viscosity of the nut solids/oil mixture since the distribution of the fat over the particles surface is enhanced.

DETAILED DESCRIPTION OF THE INVENTION

The present invention relates to a process for making a paste from oil seeds, and preferably from peanut oil seeds to produce a peanut butter. While this invention will be generally described in terms of peanuts and peanut butter, it should be readily apparent that other materials such as almonds, pecans, walnuts, sunflower seeds, sesame seeds, pumpkin seeds and soybeans could be utilized in this process. The term "nut" as used herein encompasses these nuts and oil seeds. Mixtures of these nuts and oil seeds can also be used.

The term "nut butter" as used herein, means a spreadable food product made from nut solids and oil, and encompasses spreads and purees. Butters usually contains from about 40% to about 60% nut solids and about 25% to about 55% oil or fat. The remainder being additives, e.g., sweeteners, stabilizers, flavoring agents, proteins and non-nutritive bulking agents.

Nut butter includes, but is not limited to the terms "peanut butter" and "peanut spread" as these are defined by the standards of identity of the Food and Drug Administration.

The oil used in the composition can be the oil which naturally comes from the nut or seed during the grinding and defatting step. Oils such as soybean oil, palm oil, cottonseed oil, coconut oil, walnut oil and other suitable oils can also be used herein to make the nut butter. Preferably, for peanut butter, peanut oil is used. With other products, such as the sunflower seeds and other nuts, mixtures of oils may be preferred for flavor. During the milling process some oil is released from nut solids.

Low calorie oils and zero calorie oils such as sucrose polyesters of long chain fatty acids (olestra) and other polyol polyesters of fatty acids can be used (see for example U.S. Pat. Nos. 3,600,186 to Mattson, et al and 4,005,196 to Jandacek). Mixed triglycerides made from medium and long chain saturated and/or unsaturated fatty acids can also be used herein. An oil which contains at least 10% medium chain triglycerides can also be used. Medium chain triglycerides contain saturated fatty acids having from six to twelve carbon atoms. Reduced calorie peanut butters containing medium chain triglycerides are described in U.S. Pat. No. 4,863,753 (Hunter, et al., 1989).

The stabilizer can be any of the known peanut butter stabilizers, for example, hydrogenated rapeseed oil, or other hydrogenated triglycerides having a high proportion of C-20 and C-22 fatty acids. (See for example, U.S. Pat. No. 3,597,230 and U.S. Pat. No. 3,192,102.) Stabilizers are usually triglycerides which are solid at room temperature. They solidify in the nut butter in specific crystalline states and keep the oil from separating. These materials can be mixed with a second hydrogenated oil having an iodine value of less than 8, for example hydrogenated palm oil, canola oil, soybean oil, cottonseed oil, coconut oil, and similar materials. This stabilizer can also be mixed with lower melting fat fractions as, for example, the peanut butter stabilizer composition disclosed in U.S. Pat. No. 4,341,814 (1982).

In addition to the stabilizer, or in lieu thereof, an emulsifier can be used in the composition. The emulsifier can be any food compatible emulsifier such as mono-and di-glycerides, lecithin, sucrose monoesters, polyglycerol esters, sorbitan esters, polyethoxylated glycols and mixtures thereof. Up to about 3% and preferably from 1% to 3% stabilizer or emulsifier is used.

Nut butters can optionally contain flavorants. "Flavorants," as the term is used herein, are agents which contribute to or enhance the flavor of the nut butter. These include sweeteners, flavor enhancers, artificial sweeteners, natural and artificial flavors, flavored or candied bits, nut chunks and other additives which contribute to the flavor of the butter or spread. Sweeteners are selected from the group consisting of sugars, sugar mixtures, artificial sweeteners and other naturally sweet materials. Sugars include, for example, sucrose, fructose, dextrose, honey, molasses, high fructose corn syrup, lactose, maltose, and maltose syrups. Preferably, the sweetener will be something which has a sweetness intensity about that of sucrose or fructose. Sweeteners are added at a level of 0% to about 8%; preferably from about 1% to about 6%.

Artificial sweeteners include compositions such as aspartame, acesulfam, saccharine, cyclamate, glycyrrhizin and other artificial sweeteners. The amount of artificial sweetener used would be that effective to produce the sweetness that is desired; and would be about the equivalent of the addition of from about 1% to 7% of sucrose.

Flavor enhancers include salt or salt substitutes such as potassium chloride, sodium chloride/potassium chloride mixtures, and seasoned salts. The level of flavor enhancer used is a matter of the desired taste level, but usually is from about 0.1% to about 2%. Other flavorants include natural or artificial peanut flavors, roasted flavors, and praline/carmel flavors, walnut flavors, almond flavors and flavor compositions.

Nut chunks, and other flavored additives can be mixed with the peanut butter. These additives include chocolate chips or bits or other flavored bits, e.g. butterscotch and peanuts, jellies, (either low calorie jellies or regular jelly or preserves), and pralined nuts or other candies. Proteins, such as sunflower seeds, albumin, whey protein, or soy protein, can be added to fortify this low fat product with protein materials. These additives are usually added at a level of from about 1% to about 20% by weight. Nut chunks and flavored bits can contain fats and oils. Therefore, the addition of these materials can affect the fat content and the calorie level of the nut butter.

Bulking agents can also be used in the formulation. Bulking agents add body or texture to the product and are usually non-nutritive or low calorie materials. Polydextrose (from Pfizer Chemicals) is a preferred bulking agent. Fibers, such as cellulose, can also be added. Sugar substitutes which function like sugars but which are non-nutritive can also be used herein. Such sugar substitutes include the 5-C-hydroxymethyl-aldohexoses described in copending application of Mazur, Ser. No. 190,486 filed May 5, 1988. Usually from about 5% to 40% bulking agents are added. Preferably from about 12% to about 27% are used.

PROCESSING

To make a nut butter, a nut paste is formed. It is prepared by roasting nuts which have been cleaned to remove all the debris. In some cases the nuts are blanched. Any conventional roasting technique can be used to prepare the nuts for processing.

The roasted nuts are first ground, in a conventional grinder or mill to produce a nut paste of pumpable consistency. The exact particle size and type of mill used are within the skill of the art. A Bauer mill is one conventional mill that can be used to make a nut paste.

The nut paste is then defatted, the particle size of the solids reduced, and the solids are processed in a "smearing" device to smooth the particle surface. Smearing and particle size reduction can be done in the same process step. These steps are defined as follows:

As used herein, the term "defatted" means that some oil or fat is removed from the nut solids. This can be done by a hydraulic press, an expeller, centrifuge or other conventional means.

As used herein, the term "particle size reduction" or "means for reducing the particle size" means that the nut particles are further ground or milled to meet the particle size distribution requirements of this invention.

As used herein, the term "smearing device" or "smearing process" means that the nut particles are processed in a manner which smooths the surface of the nut particles, i.e. it removes the cytoplastic reticuli from the protein and starch bodies. Smearing devices include twin screw mixers, roll mills, colloid mills and extruders, preferably twin screw extruders.

A. Defatting or Deoiling Step

To make the nut solids having the particle size distribution required by this invention, the nut paste is defatted to about 5% to about 33% total fat content. A hydraulic press similar to that used to remove cocoa butter from cocoa solids can be used. Any press or similar device used to deoil or defat solids can be used. The term "deoiled" does not mean that all the fat or oil has been removed. It means that the oil or fat which is easily pressed out of the ground nut paste is removed. Deoiled solids will contain at least about 5%, and usually between about 15% and about 33% fat or oil, preferably about 23% to 27%, and most preferably about 25%.

The cake or paste which is produced by this defatting process is then made into a powder to feed to the roll mill. Any conventional milling or delumping equipment can be used. Usually the powder has the consistency of coarse flour. Preferably, the deoiled nut cake will pass through a Tyler 28 mesh sieve, or be less than 550 microns in size. Because the particles contain oil, they are not easily sieved. Thus, passing the material through screens is not a preferred method of removing the lumps or of separating large particles.

B. Particle Size Reduction

The nuts are then fed to a roll mill such as the five roll Buhler SFL mill manufactured by Buhler Manufacturing of Uzwil, Switzerland. Other mills which can be used include a four-roll or five roll Lehman mill manufactured by Lehman Maschinefabrik GmbH, Aalen/-Wurtt, Germany. Preferably a five roll mill is used. The more rolls, up to five, that are used on the mill the more efficient the process becomes. For example, if two rolls are used, it may be necessary to re-mill the product more times to achieve the desired result.

Roll diameters of from about 8 inches (20.3 cm) to about 20 inches (50.8 cm) are commonly used.

The granular, deoiled nut solids are fed to the roll mill. The feed rate to the mill is controlled by the operating parameters of the mill. Usually the product is "choke" fed to the mill, i.e., the product is constantly fed to the roll mill so that there is always a supply of product in the trough formed by the intake sides of the first nip. In other words, product is constantly being fed to the rolls so that they remain full.

The mills are operated at a zero gap between the rolls. The rolls are pressed together by a hydraulic system and are moved apart by the product. Typically a five roll chocolate refining mill operates on a floating roll principle. That is, the second roll is fixed and the third, fourth and fifth rolls float over the product. The corresponding roll gap sets itself according to the different speeds and pressures on the individual rolls and is proportional to the feed gap. The feed gap affects the overall milling efficiency since it affects the amount of material fed to the rolls and degree of fineness. Too much material fed to the rolls results in poor product transfer through the rolls causing uneven roll coverage. Because of the material's dry nature the feed nip pressure must be sufficiently high to overcome the resistance of the material as it passes through the first nip. Failure to do this will result in the solids pushing the rolls too far apart leading to excessive material fed to the rolls. The amount of pressure applied to the feed nip depends upon the dimensions of the roll mills used (i.e., roll crown, diameter, length) and fat content of the nut solids. A typical Buhler SFL five roll mill with 900 mm roll length and 40 cm diameter requires a gauge pressure setting of 70 kgm/cm$^2$. The top roll pressures utilized in this mill are adjusted so that the product is subjected to a uniform pressure across the rolls. To compensate for the belt tension on the gear side of the roll, the amount of pressure is set at about 6 kgm/cm$^2$ higher than the other side. Thus the top roll pressures used in this roll are 33 and 27 kgm/cm$^2$.

The speed of the rolls is such that the product passes through the rolls and is sheared in an efficient manner. Roll speeds of from about 4 to about 90 revolutions/-min. or about 15 to about 375 feet/min. (450 cm/min to 11,250 cm/min) can be used (These values are based on a 15$\frac{3}{4}$ inch, 39.4 cm, roll diameter). Differential roll speeds are used. Usually differential ratios of the second roll to the last roll of the mill (usually the fifth) range from about 1:3 to about 1:10. The ratio of differential speed can vary; that is, it can be 1:3.25 for rolls and 1 and 2; 1:2.7 for rolls 2 and 3; 1:1.7 for rolls 3 and 4; and 1:1.4 for rolls 4 and 5.

The temperature of the rolls is usually near ambient temperature. The rolls should not be heated to a temperature that any peanut solids which might stick to the rolls or which would be in contact with the rolls for any length of time could be scorched. Cooling can be used to maintain both product temperatures and milling efficiency. Optimum roll temperatures are easily determined.

The peanut particles can be passed through the mill a second or a third time to be sure that the particle size distribution is achieved.

A second method of making the nut solids of this invention is through vibratory milling of a full fat or a deoiled nut paste for from about 5 hours to about 24 hours in a three dimensional vibratory mill. A Sweco vibratory mill can be used to achieve the particle size and distribution herein if the product is milled for these long times. This method is not preferred, however, because of the long processing times.

Other particle size reduction methods can also be used. These would include very fine grinding and passing through an extruder.

The particle size reduction process results in nut solids having a fat or oil content from about 5% to about 33% and having a monodispersed particle size distribution wherein at least 80%, of the solids have a particle sizes less than 18 microns in size. Preferably at least 90% of the solids are less than 13 microns. Most preferably the particle size is between 2 and 11 microns and the fat content is from 20% to 33%.

Particle size distribution or polydispersibility can be measured by the SPAN.

SPAN is an abstract, dimensionless width factor defined as:

$$\text{SPAN} = \frac{D_{90} - D_{10}}{D_{50}}$$

$D_{90}$ is the diameter of the ninetieth (90th) percentile particles, i.e. 90% of the sample would have a smaller particle size. $D_{50}$ and $D_{10}$ are defined in a similar manner and represent the 50th and 10th percentiles respectively. Accordingly, a completely monodisperse particle size distribution whereby $D_{90}=D_{10}$ would have a span equal to zero. A SPAN of less than 2.5 defines the particle size distribution of this invention. A SPAN of 1.0 to about 2.2 is preferred.

Particle size is measured with an instrument which uses a light scattering technique such as the Malvern particle size analyzer. The method using this instrument is given below. Any light scattering analysis can be used. Because of the nature of these solids, and because of their fat content, the particles cannot be analyzed by conventional sieving or air classification techniques unless all of the fat is removed and the particles are dried to a powder.

C. Smearing Process

The rheology of peanut butter or nut butter in its melted state (stabilizers are in the liquid state) can be characterized by the Casson flow equation which relates rate of shear and stress. This rheological equation may be written as:

$$\tau = K_0 + K_1\sqrt{D}$$

where $\tau$=stress, D=shear rate and $K_0$ and $K_1$ are constants. It has been well established that this equation is linear for many solid suspensions such as inks and chocolates. Thus $K_0^2$ and $K_1^2$ can be regarded as measuring yield value and plastic viscosity respectively. The Casson plastic viscosity measures the viscosity of a solid suspension at an infinite shear rate. A Casson plastic viscosity of less than 12, and preferably from about 3.5 to about 9 poise, is preferred for the reduced fat peanut butters prepared from the nut solids of this invention.

A smearing process, such as multiple milling of the defatted peanut solids, results in a decrease in Casson plastic viscosity, but no further decrease in particle size. This change in viscosity is believed to be due to a smoothing of the protein bodies' surface. Scanning electron microphotographs show that the cytoplastic reticuli adhering to the surfaces of the protein bodies are removed with successive milling or smearing of the nut solids.

The multiple passes through the mill can be replaced by processing in a colloid mill or other smearer type of mixer. Hammer milling and impact milling do not accomplish the smearing required herein. Other mixers which can be used include extruders and twin screw mixers. Twin screw extruders such as those made by Baker Perkins (England) and Werner Pfleiderer (Germany) are the preferred smearing device. Twin screw mixers are made by Readco. The extruder or twin screw mixer can be used to mix in the flavorants and other additives.

The purpose of smearing is to force the particles to grind against each other or against the processor thereby smoothing the surfaces of the protein bodies and also to distribute the oil across the surface of all the particles. Better distribution of the oil across the particles results in an increased wettability of the milled nut solids which facilitates the reconstitution of a low fat paste from peanut solids and peanut oil. With a continuous oil film over the nut solids, wettability is enhanced due to the absence of air adsorbed on the solids' surface.

The production of a peanut solid material having a particle size distribution in which more than 80% of the solids are below 18 microns in size, and having protein bodies exhibiting less cytoplastic reticuli adhering to its surface allow the production of a lower fat peanut butter than conventional processing. A 15% and 20% reduced fat peanut butter made with conventionally processed nut solids have a Casson plastic viscosity of 60 and 90 poise respectively. Similar reduced fat peanut butters made with nut solids of this invention have a Casson plastic viscosity of 1.5 to 12 poise, and preferably from about 3.5 poise to about 9 poise.

One possible mechanism for this benefit of this invention is that conventional nut solids have two particle size distributions. It is theorized that the presence of the large particles (those in the 20 to 118 micron range) cause an interlocking matrix to be formed or create "log jams" in the butter. This affects the spreadability or fluidity.

The peanut solids of this invention can be mixed with peanut oil to quickly form a fluid paste when mixed with a Hobart or similar type mixer at low speed. Unmilled peanut solids and commercially ground products require over 24 hours at a high speed setting to achieve this type of product with significantly less fluidity. Thus, the milled products produce a smooth product with less stickiness.

Another benefit of the process of this invention is that the emulsifier, stabilizer and other additives can be comilled with the nut solids. In the case of the bulking agents, and in particular, polydextrose, this comilling provides a superior method of incorporating the polydextrose into the nut butter. Polydextrose and other hygroscopic materials tend to clump or form lumps when finely powdered. When they are comilled with the deoiled nut paste, the hygroscopic materials are easily incorporated into the mixture and provide a smoother, more fluid nut butter than when added separately or via conventional processing.

Usually the flavorants, such as salt and sugar, the emulsifiers and the stabilizers are added in the mixer. The nut solid, flavorant, emulsifier and oil mixture, i.e., the nut butter, can then be packaged or further processed.

This product can also be homogenized by passing it through a homogenizer as described in U.S. Pat. No. 3,619,207 (issued to Dzurik et al, 1971). In the homogenizer, the paste can be treated alone or in combination with other peanut butter ingredients such as stabilizers, emulsifiers, sweeteners, salt and any other ingredients.

Generally, the peanut paste is introduced into the nozzle and restricted opening of the homogenizer at a pressure ranging from 3,000 to 10,000 psig, preferably ranging from 5,000 to 8,000 psig. In the homogenizer, the temperature of the peanut paste ranges from 50° F. (10° C.) to 300° F. (149° C.), preferably from about 100° F. (37° C.) to 240° F. (115° C.). The velocity of the paste is increased in the homogenizer so as to range from about 500 ft/sec (152.4 m/sec) to about 1,200 ft/second (365.8 m/sec). As a result of flowing through the restricted opening in the homogenizer, internal shear forces are set up within the peanut paste whereby the particles in the paste can be further reduced in size.

D. Preparation of the Nut Butters

The compositions herein, after being processed in the homogenizer, are then admixed with other optional ingredients if all the ingredients are not already in the product. Then the product can be subjected to conventional processing. The product is usually deaerated in a conventional deaerator to remove residual air from the product. This minimizes the oxidative rancidity of the triglycerides present in the nut butter.

The deaerated paste is then conventionally processed and packaged. This involves processing to crystallize the stabilizer, for example by treatment in a scraped wall heat exchanger and picker. From the picker, the product is filled into packages and usually tempered in the containers for about 2 days at 80° F. (26.6° C.) to 90° F. (32.2° C.) to make sure that the stabilizer is in the proper crystalline form.

Deaerating, cooling, picking and tempering are conventional in peanut butter processing. One skilled in the art can easily adapt these techniques to the nut butters of this invention.

Whipped or stabilized forms of nut butters can also be made with these nut solids. Whipped nut butters have from about 5% to about 25% by volume of nitrogen or other inert gas dispersed throughout the nut butter.

While conventional processing for forming whipped toppings can be used to make the whipped or stabilized form of nut butters, it is preferred to treat the nut butter with nitrogen under pressure. The paste is warmed to between 125° F. (52° C.) and 140° F. (60° C.) and then deaerated by passing through a vacuum deaerator. The warmed deaerated paste is pumped at approximately 100 to 300 psig pressure, preferably 220 to 260 psig (pounds per square inch gauge). Then dry nitrogen or other non-oxidizing gas such as carbon dioxide, helium, etc., is injected into the hot deaerated paste at a pressure of 280 to 340 psig. Preferably, the level of nitrogen or non-oxidizing gas is between about 10% and about 25% and most preferably between about 10% and about 20% by volume.

The butter is then chilled by passing through scraped wall heat exchanger to about 95° F. (35° C.) to 115° F. (46° C.). The product becomes whipped when it is allowed to expand through a nozzle to ambient pressure and filled into the jar. The finely milled peanut solids of this invention make a more stable whipped peanut butter than conventionally milled peanut solids.

An added benefit of this technology is that less stabilizer is required. Oil separation is significantly reduced. The lower fat level and much smaller peanut particle size produces a much slower settling rate of the peanut particles. This produces a natural peanut butter with significantly less oil separation than current natural peanut butters. It also decreases the level of hydrogenated fat required for stability. An added benefit is that these peanut butters can be dispensed out of a tube without oil separation.

A second benefit is the use of these nut solids in conjunction with conventional nut butters to provide a fluid non-sticky peanut butter at fat levels lower than can be achieved by conventional peanut butter processing. Low fat peanut butters are made by diluting the peanut solids with bulking agents having low oil binding properties, e.g., polydextrose. Low fat peanut butter with these bulking agents requires protein supplementation to avoid labeling it as imitation, since the protein and bulking agent dilute the peanut butter content.

A mixture of milled peanut solids at 20% fat level with peanut paste at 50% fat level will significantly lower the total fat of the resultant peanut butter without using any additives. Conventional peanut butter has about 50% fat. The reduced particle size peanut solids of this invention can be used to make peanut butter with from 15% to 25% less fat, that is from 37% to 42% fat products. The milled peanut solids can also be mixed with unmilled, conventionally ground solids to make a lower fat product. A peanut butter with fat levels above 37% can be achieved by adding milled peanut solids having a 20% fat level to a conventional peanut butter having a 50% fat level in a ratio of 17:74 to about 34:57 of milled peanut solids to peanut paste.

It should be noted that the fat or oil content of the nut solids is included in the total fat or oil content of the nut butter composition.

CASSON VISCOSITY MEASUREMENT

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. and all samples are measured at 65° C.

A sample size of 13.5 grams of peanut butter is placed in the sample cell. The sample cell is then inserted in the jacketed cell holder. To compensate for heat losses through the tubings, etc, the water temperature entering the jacketed cell holder should be a few degrees higher than the desired sample temperature of 65° C. After the temperature of the sample has reached 65° C. the sample is pre-sheared for about three minutes at 50 rpm. The speed is then changed to 100 rpm and a measurement taken after the dial reading settles to a constant value. A total of five scale readings are recorded for 100, 50, 20, 10 and 5 rpm. In general, the time before reading should be:

TABLE I

| RPM | Time Before Reading (Seconds) |
|---|---|
| 100 | 3 |
| 50 | 6 |
| 20 | 15 |

TABLE I-continued

| RPM | Time Before Reading (Seconds) |
|---|---|
| 10 | 30 |
| 5 | 60 |

The dial reading and rpm are converted into shear stress and shear rate values by multiplying the rpm and dial reading by 0.34 and 17 respectively. A plot of the square root of shear stress vs the square root of shear rate results in a straight line. Readings where the dial pointer goes off scale are ignored. A least squares linear regression is made over the data to calculate the slope and intercept.

This data is used to calculate two values. The first of these is the plastic viscosity which is equal to the slope of the line squared. The plastic viscosity is a measurement of the peanut butter's viscosity at an infinite shear rate. It accurately predicts the resistance to flow in pumping, moving or mixing situations. The plastic viscosity is measured in poise.

The second value is the yield value which is equal to the value of the x intercept (abscissa) squared. The yield value is a measure of amount of force or shear that is necessary to get the peanut butter to start moving. The relationship between the plastic viscosity and the yield value determine how a peanut butter will react in additional processing. The yield value is measured in dynes per square centimeter.

PARTICLE SIZE ANALYSIS

A Malvern 2600D particle size analyzer with a Commodore computer was used to analyze the particle size of the samples. A small amount (about 0.01 grams) of each sample was placed in a 25 ml test tube and about 15 ml of acetone are added to it. The sample is dispersed in the acetone by using a vortex mixer. A transfer pipet is then used to add this diluted solution dropwise to the acetone filled cell of the analyzer. The sample is added until the obscuration is 0.2 to 0.3. The obscuration refers to the amount of light which is obscured by the sample because of diffraction and absorption. The instrument reads more accurately when the obscuration is 0.05 to 0.5 and preferably from 0.2 to 0.3 (20% to 30% of the light energy is reduced).

The apparatus is fitted with a 63 mm lens to determine the particle size of the paste. A magnetic stirrer is used to insure that the sample is being dispersed during the readings. Each sample is swept 250 times by the laser for each reading. Each sample was read a minimum of three times with a five (5) minute wait between each reading.

Example I

| Formulation Ingredients | Amount |
|---|---|
| Sucrose | 5.8% |
| Salt | 1.2% |
| Molasses | 0.5% |
| lecithin* | 1% |
| Hardstock* | 0.5% |
| Peanut cake (25% fat basis) | 73.83% |
| Peanut Oil | 17.16% |

*The hardstock is hardened rapeseed oil blended with hydrogenated soybean oil.

The peanut cake is prepared by the following method:

Peanuts are roasted, blanched, and ground to a particle size of less than 118 microns. The product is defatted to a fat content of 25% by pressing in a hydraulically operated cocoa powder press for 10 minutes at 5000 psi (pounds per square inch, kg/cm2). The resultant cake is delumped by passing it through a Fitzmill. The solids have a coarse, floury consistency. This product is passed through a 5 roll Buhler mill fitted with 15.75 inch (39.3 cm) diameter rollers that are 900 mm wide. The rollers are at 30° C. temperature. The feed to the mill was at a rate that the rolls always had nut solids on them. The rate was 2000 lbs/hour (908 kg/hr) in the first pass and 3000 lbs/hour (1,362 kg/hr) in subsequent passes. The differential roll speeds were as in Table I. Three separate runs were made. Table II gives the particle size distribution as measured by the Malvern particle Size Analyzer. The rolls were set at 0 gap, and a feed gap having a gauge pressure of 70 $kg/cm^2$ and a top roll pressure of 33 and 27 $kg/cm^2$. Typically the following roll speeds are used for a five roll mill:

TABLE I

| Roll | Speed | |
|---|---|---|
| | Rev./Min | Ft./Min. |
| 1 | 4 | 16 |
| 2 | 13 | 52 |
| 3 | 34 | 139 |
| 4 | 58 | 239 |
| 5 | 82 | 338 |

Table II gives the particle size distribution and the SPAN for three different peanut solids preparations.

The ingredients and the solids from each of the runs are mixed together in a mixer at low speed to produce a peanut butter. The peanut butters from runs 1 through 3 are creamy, and do not show a tendency to stick to the roof of the mouth. The viscosity is reduced with successive milling. The peanut butters have a fat content of 37%.

TABLE II

| Particle Size (Microns) | Run 1 2 passes | Run 2 3 passes | Run 3 4 passes | Unmilled Solids |
|---|---|---|---|---|
| 118-54.9 | 0 | 0 | 0 | 0.25 |
| 54.9-33.7 | 0 | 0 | 0 | 11.20 |
| 33.7-23.7 | 0.95 | 0.13 | 0.30 | 15.55 |
| 23.7-17.7 | 2.00 | 0.80 | 1.10 | 9.50 |
| 17.7-13.6 | 3.20 | 2.65 | 2.20 | 7.15 |
| 13.6-10.5 | 5.65 | 5.00 | 4.60 | 6.60 |
| 10.5-8.2 | 11.03 | 11.60 | 10.60 | 7.95 |
| 8.2-6.5 | 22.50 | 21.10 | 25.00 | 12.70 |
| 6.4-5 | 21.50 | 12.75 | 23.00 | 12.80 |
| 5-3.9 | 15.85 | 17.40 | 16.70 | 8.00 |
| 3.9-3 | 6.85 | 6.55 | 6.90 | 3.10 |
| 3-2.4 | 4.15 | 3.75 | 4.40 | 1.60 |
| 2.4-1.9 | 2.93 | 3.30 | 3.50 | 1.00 |
| 1.9-1.5 | 1.30 | 1.25 | 1.10 | 0.60 |
| 1.5-1.2 | 0.60 | 0.30 | 0.30 | 0.65 |
| <1.2 | 1.50 | 0.60 | 0.50 | 0.95 |
| SPAN | 1.41 | 1.18 | 1.18 | 3.04 |
| $D_{50}$ = Mean (Microns) | 6.07 | 6.01 | 5.99 | 10.64 |

EXAMPLE II

Peanut paste (50% fat) is placed in a Sweco vibratory mill and milled for several hours. The Sweco Mill is a three dimensional ball mill. The particles are a monodispersion after 5 hours.

| Milling Time (hours) | SPAN |
|---|---|
| 0 | 2.63 |
| 1 | 2.88 |
| 3 | 2.77 |
| 5 | 2.48 |
| 7 | 2.28 |
| 18.5 | 1.59 |
| 23 | 1.50 |

When de-oiled nut solids are used, similar results are obtained.

EXAMPLE III

Sample 1 is a full fat peanut butter prepared using conventional grinding and processing. The nut solids are not milled. Its SPAN is 2.97.

Sample 2 is the same peanut butter but with 15% less fat. Its SPAN is 2.98.

Sample 3 is the same as sample 1 but with 20% less fat. Its SPAN is 2.82.

Sample 4 is a peanut butter in which the nut solids have been milled as in Example 1. The sample contains 15% less fat than Sample 1. Its SPAN is 1.45.

Sample 5 is a full fat milled peanut butter. Its SPAN is 1.44.

Sample 6 is a peanut butter made according to Example 1, but having 20% of the fat removed. Its SPAN is 1.53.

Table III gives the plastic viscosity and yield values for these products.

TABLE III

| Sample | Plastic Viscosity (poise) | Yield Value (dynes/cm$^2$) |
|---|---|---|
| 1 | 10 | 40 |
| 2 | 59.4 | 124 |
| 3 | 77.7 | 164 |
| 4 | 3.9 | 131 |
| 5 | 1.3 | 25 |
| 6 | 5.9 | 237 |

EXAMPLE IV

| Ingredients | Example IV Formulation Amount |
|---|---|
| Sucrose | 5.8% |
| Salt | 1.2% |
| Molasses | 0.5% |
| lecithin* | 1% |
| Hardstock* | 0.5% |
| Peanut cake (20% fat basis) | 69.22% |
| Peanut Oil | 21.78% |

*The hardstock and lecithin are the same as in Example I.

The peanut cake is prepared by the following method:

Peanuts are roasted, blanched, and ground to a particle size of less than 118 microns. The product is defatted by pressing in a hydraulically operated cocoa powder press for 15 minutes at 5000 psi (pounds per square inch, 351 kg/cm$^2$). The resultant cake is delumped by mixing it in a Hobart mixer. The solids have a coarse, floury consistency. This product is passed through a 4 roll Lehman mill fitted with 8 inch (20 cm) diameter rollers. The rollers are at ambient temperature. The feed to the mill was at a rate that the rolls always had nut solids on them. The differential roll speeds were as in Table IV. Two separate runs were made. The rolls were set at 0 gap, and a pressure of 350psi.

TABLE IV

| | Roll Rev./Min | Speed Ft./Min. |
|---|---|---|
| 1 | 18 | 38 |
| 2 | 44 | 91 |
| 3 | 98 | 206 |
| 4 | 126 | 264 |

Table V gives the particle size distribution as measured by the Malvern Particle Size Analyzer and the SPAN for three different peanut solids preparation.

In run 1 the entire width of the roller was not covered with peanut solids. While the gauge pressures of the roll are 350 psi, (24.6 kg/cm) the effective pressure is 1166 pounds per linear inch (211.4 kg/cm). In run 2, the entire width of roll covered with peanut solids. The effective pressure is 292 pounds per inch (51.8 kg/cm). The ingredients and the solids from each of the runs are mixed together in a mixer at low speed to produce a peanut butter. The peanut butters from runs 1 to 2 are creamy, and do not show a tendency to stick to the roof of the mouth. The peanut butters have a fat content of 37%.

TABLE V

| Particle Size (Microns) | Run 1 | Run 2 | Unmilled Solids |
|---|---|---|---|
| 118-54.9 | 0 | 0 | .25 |
| 54.9-33.7 | 0 | 1.9 | 11.20 |
| 33.7-23.7 | 0.95 | 3.10 | 15.55 |
| 23.7-17.7 | 1.95 | 4.45 | 9.50 |
| 17.7-13.6 | 2.80 | 4.85 | 7.15 |
| 13.6-10.5 | 4.50 | 6.15 | 6.60 |
| 10.5-8.2 | 10.65 | 20.70 | 7.95 |
| 8.2-6.5 | 23.55 | 11.45 | 12.70 |
| 6.4-5 | 19.95 | 18.35 | 12.80 |
| 5-3.9 | 15.10 | 13.00 | 8.00 |
| 3.9-3 | 7.85 | 6.55 | 3.10 |
| 3-2.4 | 4.80 | 3.55 | 1.60 |
| 2.4-1.9 | 2.50 | 2.3 | 1.00 |
| 1.9-1.5 | 1.20 | 1.2 | 0.60 |
| 1.5-1.2 | 0.9 | 0.6 | 0.65 |
| <1.2 | 3.25 | 1.75 | 0.95 |
| SPAN | 1.4 | 1.91 | 3.04 |
| $D_{50}$ = Mean (Microns) | 6.00 | 6.62 | 10.64 |

EXAMPLE V

A peanut cake is made according to Example IV, run 2. This cake (1070.88 gm) is milled with polydextrose (460 gm) in a four roll Lehman mill. This comilled mixture is then mixed with 20 gm of salt, 40 gm of Centrolex F®, 22.5 gm of hardstock (low euricic acid hydrogenated rapeseed oil), and peanut oil (399.12 gm). This mixture is passed through a homogenizer and packaged. The product is a creamy peanut butter with 33% less fat (33.17% fat) than conventional peanut butter and 23% less calories than conventional peanut butter but it is nutritionally equivalent to peanut butter.

EXAMPLE VI

Defatted peanut solids (25% fat) are rolled milled in two passes on the Lehman 4 roll mill to a particle size of less than 18 microns and a SPAN of less than 2.5. These solids are fed at 60 lbs per hour into a Baker Perkins twin screw extruder Model MPF-50D which has a 50 inch (125 cm) barrel that is 2 inches (5 cm) in diameter. The barrel is heated to 160° F. (71° C.). The barrel is fitted with a feed screw, and alternate lead screws and reverse paddles and no die. Peanut oil is added at three separate locations along the length of the extruder barrel. In each location 2.56 lbs/hr of peanut oil is metered in for a total addition of 7.67 lbs/hr of peanut oil. Addition of peanut oil in this manner increases the shearing in the extruder as a result of the higher viscosity of the paste in the first part of the extruder. The screw speed is at 200 rpm and the final paste fat is 33.5%.

A 42% fat peanut butter is prepared with this paste by mixing it with peanut oil, sugar, salt and emulsifier in a mix tank. The product is then homogenized and packaged. Analysis of this peanut butter's rheology showed that it has a Casson plastic viscosity of 2.3 poise and a Casson yield value of 181 dynes/cm$^2$. The peanut butter is equivalent in texture to a full fat (50%) commercial product.

Alternately all of the minor ingredients (sugar, salt, molasses, etc.) are mixed in the extruder with peanut oil to make the same product.

What is claimed is:

1. A nut or oilseed butter composition having a Casson plastic viscosity of less than 12 poise, consisting essentially of:

(a) from about 40% to about 67% roasted nut solids, at least 80% of said solids having a particle size less than 18 microns and a SPAN of less than 2.5;
(b) from about 15% to about 33% oil;
(c) from 0% to about 3% stabilizer;
(d) from 0% to about 30% bulking agent;
(e) from 0% to about 8% flavorant; and
(f) from 0% to about 3% emulsifier.

2. A product according to claim 1 wherein said solids have a SPAN of about 1 to about 2.2.

3. A product according to claim 2 wherein the nut is selected from the group consisting of peanuts, walnuts, pecans, almonds, and mixtures thereof.

4. A product according to claim 3 wherein the flavorant is selected from the group consisting of sweeteners, artificial sweeteners, flavoring agents, and flavor enhancers and mixtures thereof.

5. A product according to claim 4 wherein the flavorant is present in an amount of from about 1% to about 7%.

6. A product according to claim 5 wherein said sweetener is selected from the group consisting of sucrose, dextrose, fructose, honey, molasses, high fructose corn syrup and mixtures thereof.

7. A product according to claim 3 wherein the stabilizer is present in an amount of from about 0.5% to about 3%.

8. A product according to claim 7, which contains from about 5% to about 40% bulking agent.

9. A product according to claim 8 wherein the stabilizer is selected from the group consisting of hydrogenated rapeseed oil, canola oil, hydrogenated cottonseed oil and mixtures thereof.

10. A product according to claim 7 containing from 0.5% to 3% of a food compatible emulsifier.

11. A product according to claim 10 wherein the nut solids are selected from the group consisting of sesame seed, soybean, pumpkin seed, sunflower seed and mixtures thereof.

12. A product according to claim 10 wherein said nut solids have a SPAN of from about 1 to about 1.5.

13. A product according to claim 8 wherein said bulking agent is polydextrose.

14. A low fat peanut butter composition having a Casson plastic viscosity of less than 12 poise consisting essentially of:

(a) from about 40% to about 50% roasted peanut solids, 80% of said solids having a particle size less than 18 microns and a SPAN of from about 1 to about 2.5;
(b) from about 15% to about 33% oil;
(c) from 0% to about 3% stabilizer;
(d) from 0% to about 8% flavorant;
(e) from 0% to about 3% emulsifier; and
(f) from 0% to about 40% bulking agent.

15. A product according to claim 14 containing from about 1% to about 7% flavorant selected from the group consisting of sweeteners, artificial sweeteners, flavoring agents, and flavor enhancers and mixtures thereof.

16. A product according to claim 16 wherein the sweetener is selected from the group consisting of sucrose, dextrose, fructose, honey, molasses, high fructose corn syrup and mixtures thereof.

17. A product according to claim 15 comprising from about 0.05% to about 3% stabilizer selected from the group consisting of hydrogenated rapeseed oil, hydrogenated canola oil, and hydrogenated cottonseed oil and mixtures thereof.

18. A whipped low fat peanut butter composition having a Casson plastic viscosity of less than 12 poise consisting essentially of:

(a) from about 40% to about 50% peanut solids, 80% of said solids having a particle size less than 18 microns and a SPAN of about 1 to about 2.5;
(b) from about 15% to about 33% oil;
(c) from about 0% to about 3% stabilizer;
(d) from 0% to 8% flavorant;
(e) from 0% to about 3% emulsifier;
(f) from 0% to about 40% bulking agent; and which contains from about 5% to about 25% nitrogen.

19. A whipped product according to claim 18 which contains from about 0.05% to about 3% stabilizer and from about 1% to about 7% sweetener.

20. A process for preparing nut solids comprising defatting (1) roasted and ground nut solids to a fat content of from about 5% to about 35%; (2) reducing the particle size of the defatted nut solids, at least 80% of said nut solids have a particle size of less than 18 microns; (3) and smearing said nut solids to reduce the amount of cytoplastic reticuli attached thereto.

21. A process according to claim 20 wherein said nut solids are milled to concurrenty reduce the particle size and smear said nut solids and wherein said nut solids have a SPAN of less than 2.5.

22. A process for preparing nut solids comprising milling roasted peanut paste having from 15% to 33% fat in a three dimensional ball mill for an amount of time effective to produce nut solids having at least 80% of particles less than 18 microns and a SPAN of less than 2.5 and passing said nut solids through an extruder to reduce the amount of cytoplastic reticuli attached thereto.

23. A process according to claim 22 wherein said peanut paste is milled from about 5 hours to about 24 hours.

24. A process according to claim 20 wherein said nut solids are further passed through a smearing device selected from the group consisting of twin screw mixers, colloid mill and extruders.

25. The product of the process of claim 20.

* * * * *